July 29, 1969        W. HANSEN        3,458,253
PHOTOGRAPHIC DRAFTING MACHINES
Filed Aug. 31, 1966        12 Sheets-Sheet 4
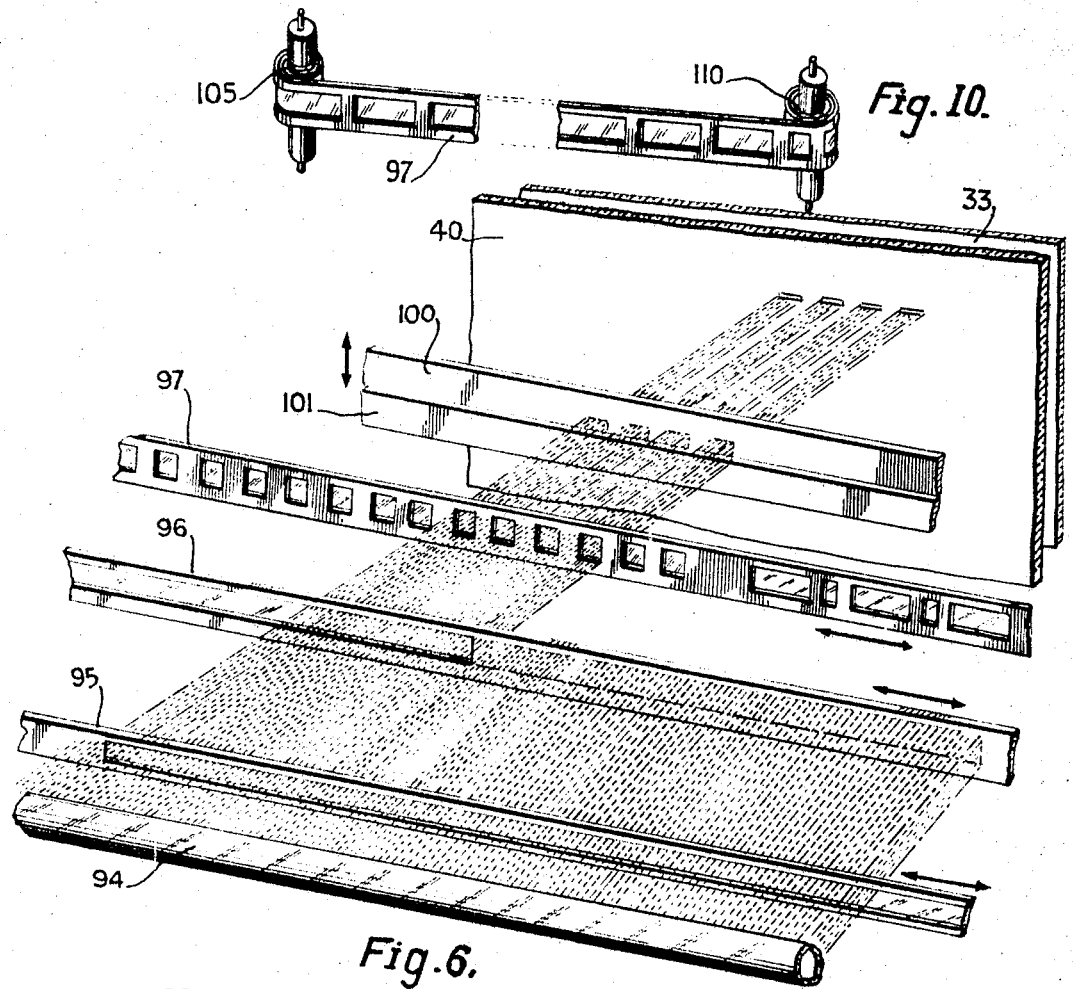
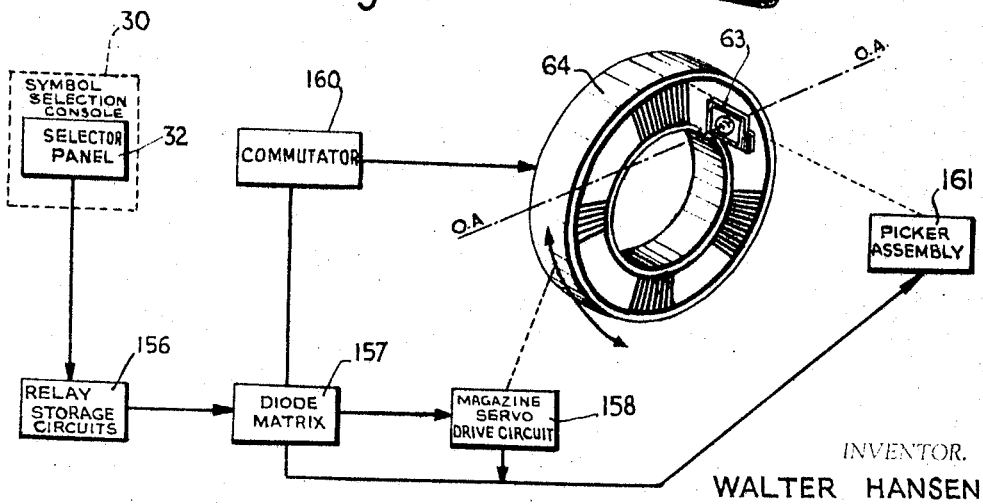
INVENTOR.
WALTER HANSEN
BY
ATTORNEY

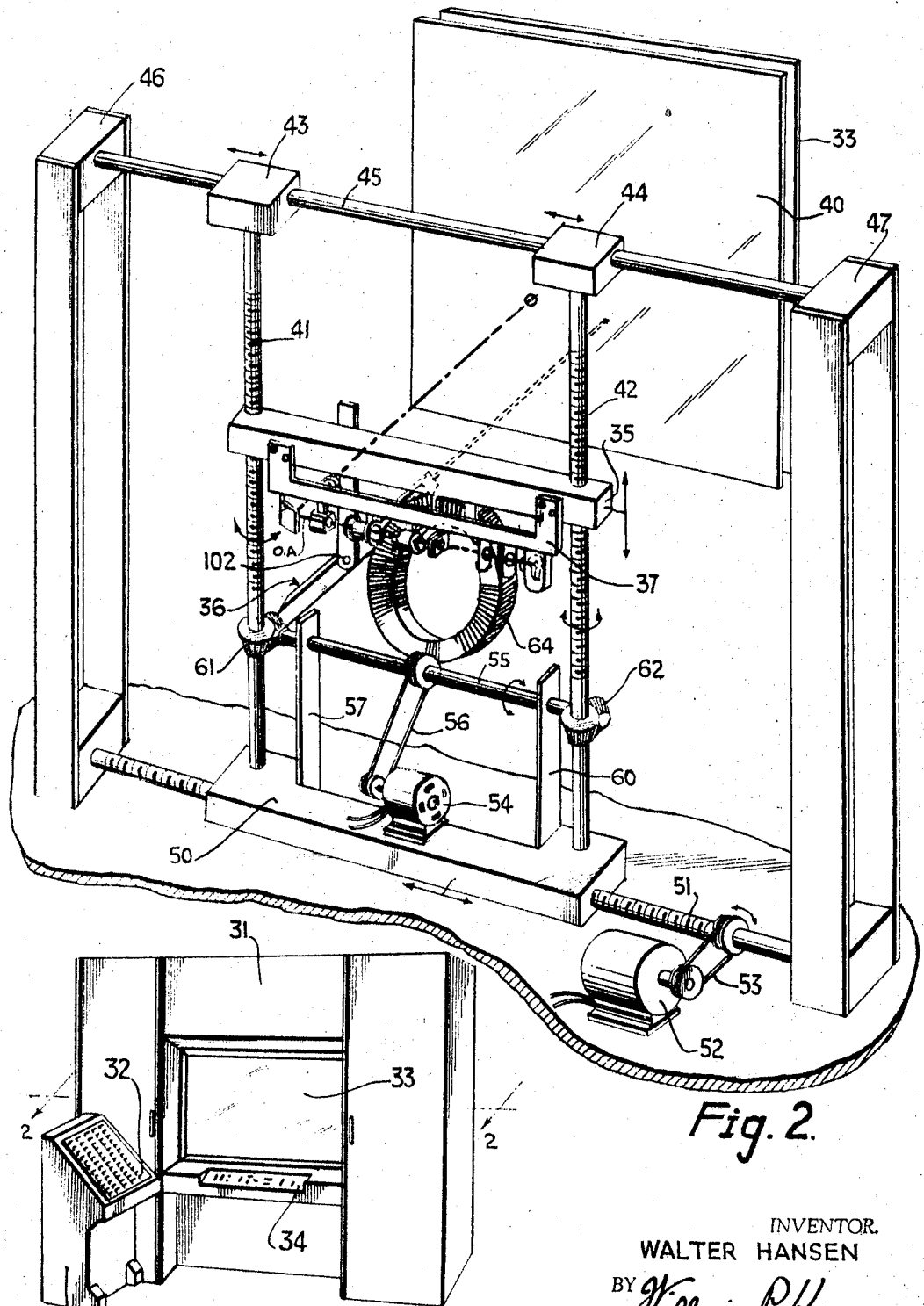

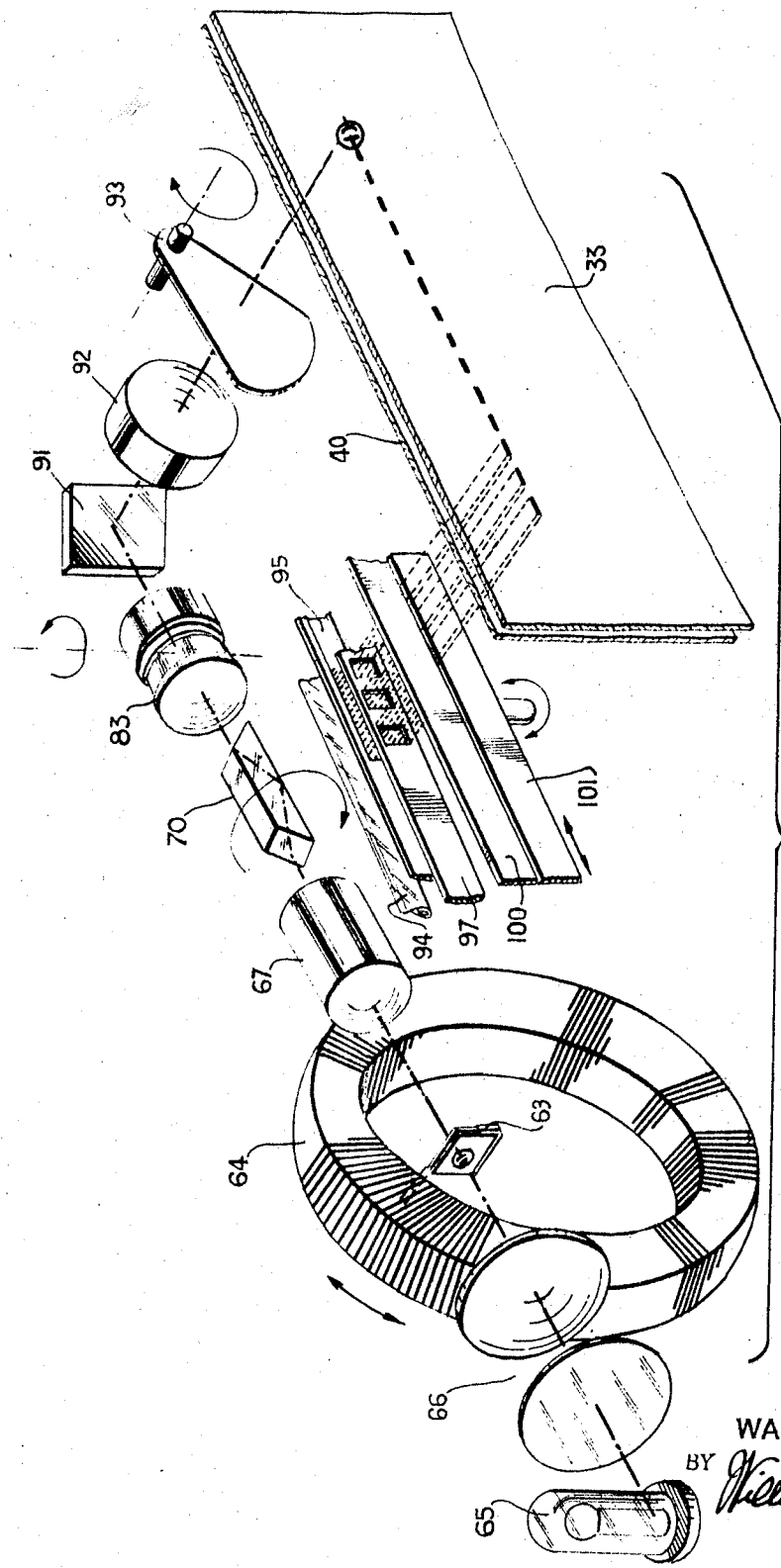

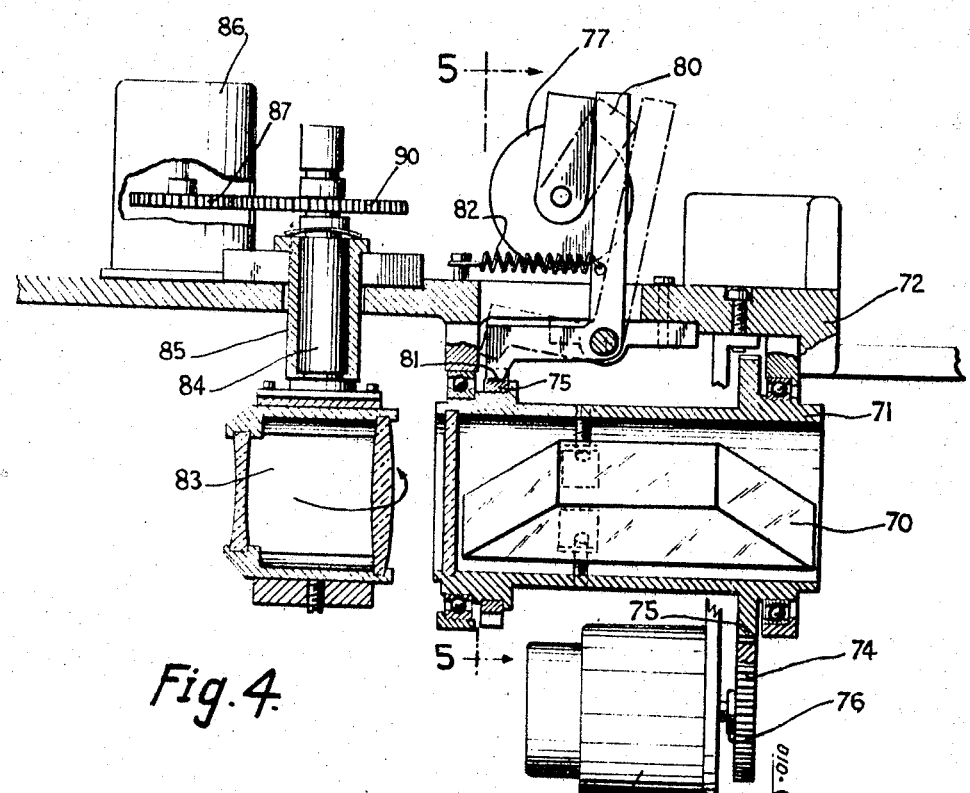
Fig. 4.
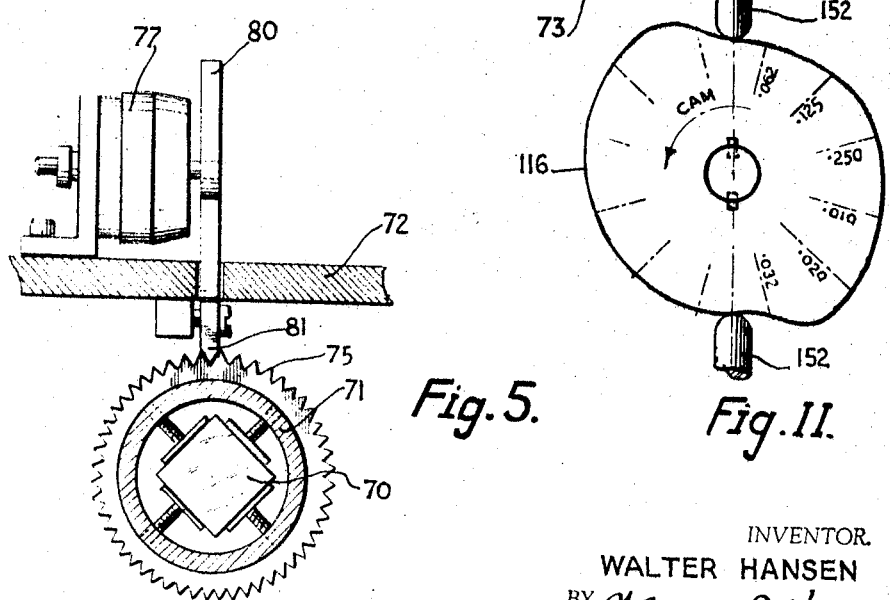
Fig. 5.   Fig. II.
INVENTOR.
WALTER HANSEN

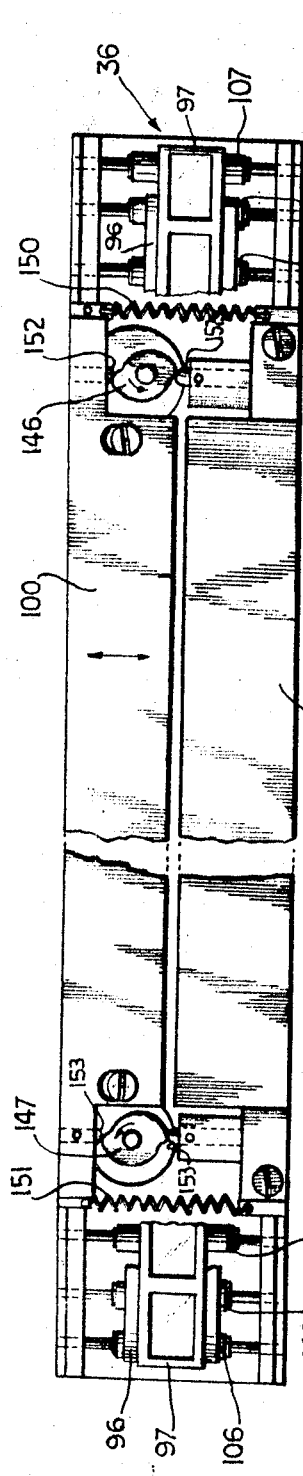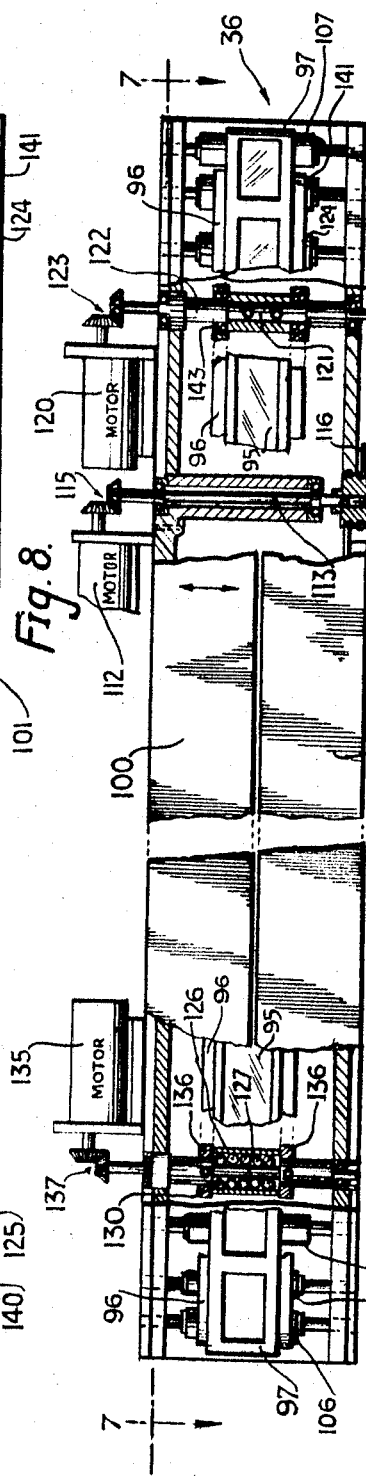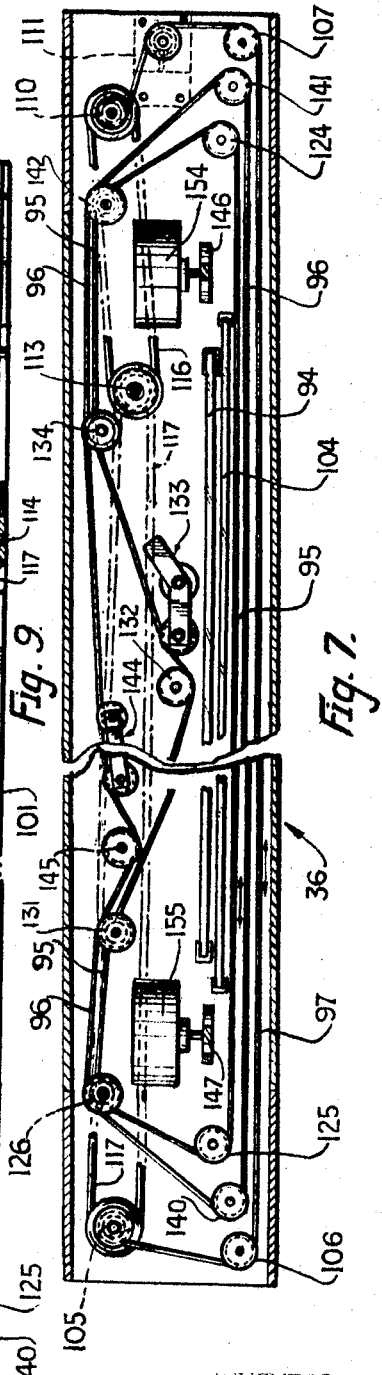

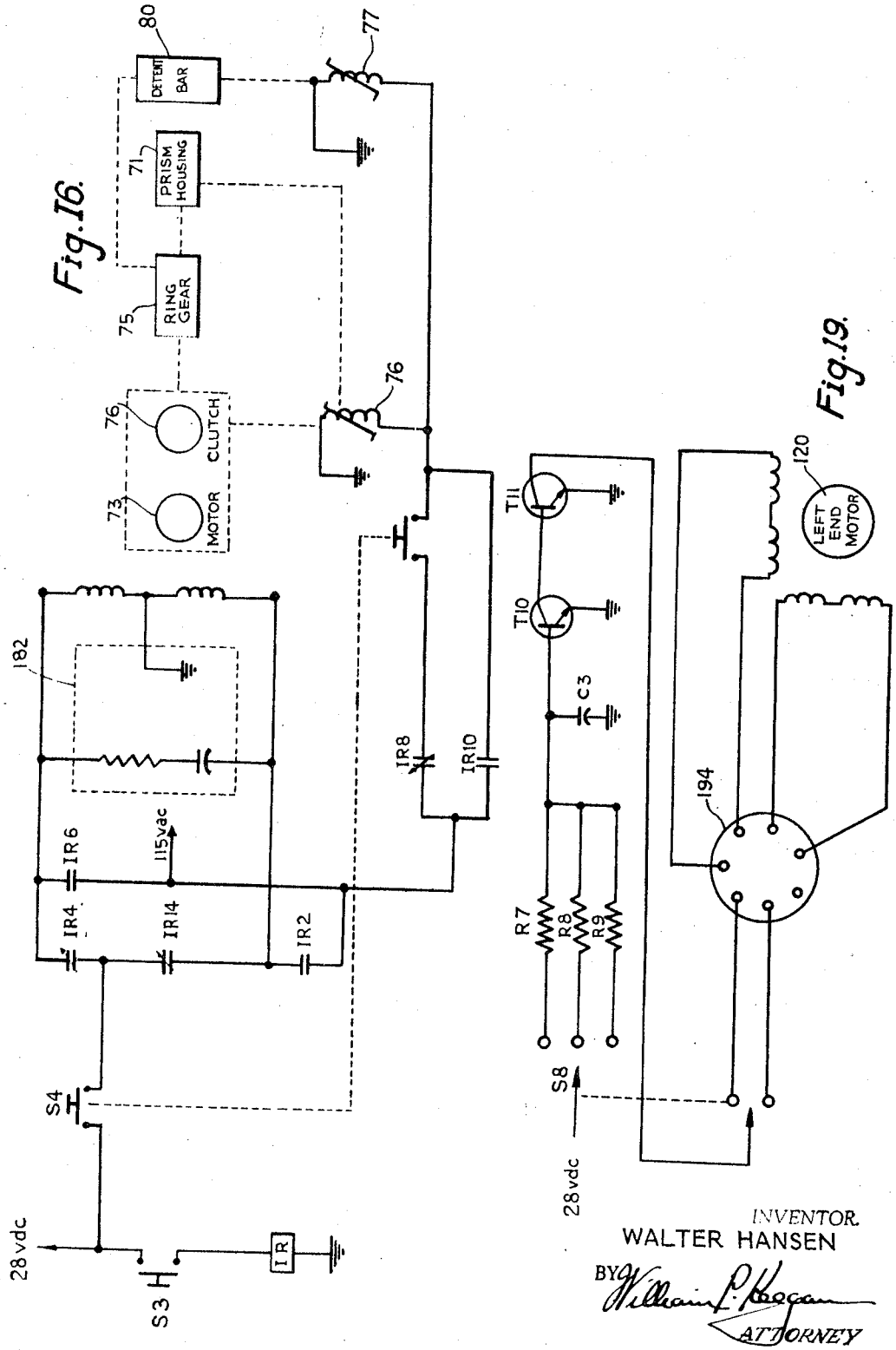

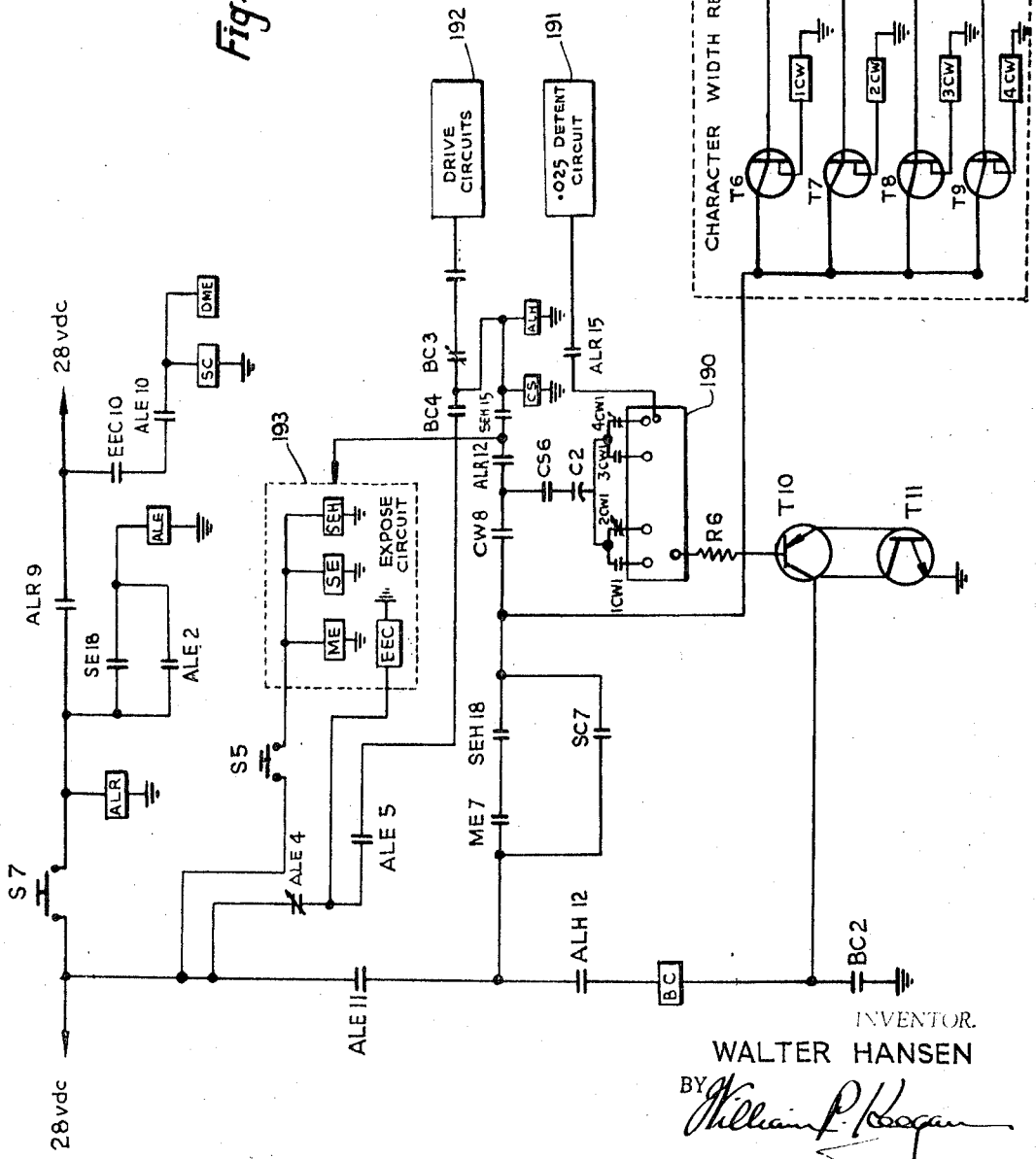

July 29, 1969     W. HANSEN     3,458,253
PHOTOGRAPHIC DRAFTING MACHINES
Filed Aug. 31, 1966     12 Sheets-Sheet 12

INVENTOR.
WALTER HANSEN
BY William P. Keegan
ATTORNEY

United States Patent Office 3,458,253
Patented July 29, 1969

3,458,253
PHOTOGRAPHIC DRAFTING MACHINES
Walter Hansen, Cold Spring Harbor, N.Y., assignor to Eltra Corporation, a corporation of New York
Filed Aug. 31, 1966, Ser. No. 576,398
Int. Cl. G03g 27/04, 27/32
U.S. Cl. 355—19                                       7 Claims

ABSTRACT OF THE DISCLOSURE

A photographic drafting machine having a slide magazine from which slides having various symbols may be withdrawn. Images of these symbols are successively projected onto a portion of a viewing screen corresponding to a like position on photosensitive material located directly behind the screen and then onto the material itself to produce a complete subject. Lines of various widths, lengths, etc. used to connect various portions of the subject are contact printed in the desired relation to already formed symbols and/or other lines. A Dove prism is used to rotate the projected symbols to facilitate their positioning.

---

This invention relates generally to a method of, and means for, preparing master copies of graphic representations such as schematic diagrams, wiring diagrams, logic diagrams and the like. More particularly, the invention relates to an apparatus which enables an operator to construct a drawing by exposing, successively, the component elements of the drawing, on photographic film.

A graphic representation consists of symbols and lines combined in a meaningful assembly and usually drawn on paper or cloth from which positive copies can eventually be produced. Heretofore, substantially all such representations were produced individually with component parts being drawn by a draftsman. Undesirable, and unavoidable, results were attendant during this procedure: uniformity in form and quality of characters and lines was difficult to achieve; the requirements for using standardized electrical symbols necessitated the use of templates and the time-consuming tracing therefrom and the preparation of electrical diagrams from a finished sketch, usually altered and interlined, and showing a complicated arrangement of interconnected electrical components, was a tedious job. Morever, to obtain copies of the finished drawings, a negative copy had to be made first before the positive copies could be reproduced.

It is seen from the above that manual preparation of schematic diagrams required the expenditure of much time, energy and expense to make them suitable for reproduction purposes.

Accordingly, it is an object of the present invention to photographically compose a schematic diagram directly upon a master negative.

A further object is the rapid and precise production of diagrams combined with rigid uniformity in the form and quality of the component parts.

A still further object is to facilitate the laying out of a diagram from a rough sketch by providing a large viewing screen at eye level thereby providing an enhanced perspective during actual composition.

In carrying out the above objects, there is provided an apparatus for selecting a symbol at a selector panel and optically projecting the symbol's image onto a desired portion of a viewing screen and onto photographic material directly behind the viewing screen. There is also provided another apparatus which causes lines of various types, lengths and widths to be formed and placed in the desired relation to already formed (and still visible) symbols and/or other lines. Simple controls allow rapid positioning and/or rotation of symbols and lines and also permit seuccessive exposures of the symbols and lines on the photographic material.

Further features and advantages of this invention will be gained from the foregoing and from the description of a preferred embodiment thereof which follows.

In the drawings:

FIG. 1 is a front perspective view showing the apparatus to consist of a symbol select console and a photographic unit.

FIG. 2 is a perspective view of the photographic unit with the covers removed taken along line 2—2 of FIG. 1.

FIG. 3 is a schematic diagram of the optical projection end line drawing components.

FIG. 4 is a detailed view, partly in section, of the image rotation prism and the magnification telescope, both components of the optical projection system.

FIG. 5 is a detailed view of the image rotation prism taken along line 5—5 of FIG. 4.

FIG. 6 is a schematic, exploded view of the line drawing mechanism of the apparatus.

FIG. 7 is a detail plan view of the line drawing mechanism of the apparatus.

FIGS. 8 and 9 are detail front views of the line width mechanism.

FIG. 10 is a schematic view of the device used to determine the character of the drawn line.

FIG. 11 is a view of the cam used to control the width of the constructed line.

FIG. 12 is a schematic and block diagram of the symbol select circuit.

FIG. 16 is a schematic wiring diagram of the symbol rotation circuit.

FIG. 18 is a schematic wiring diagram of the automatic lettering circuits.

FIG. 19 is a schematic wiring diagram of the line control circuit.

Figure 13:
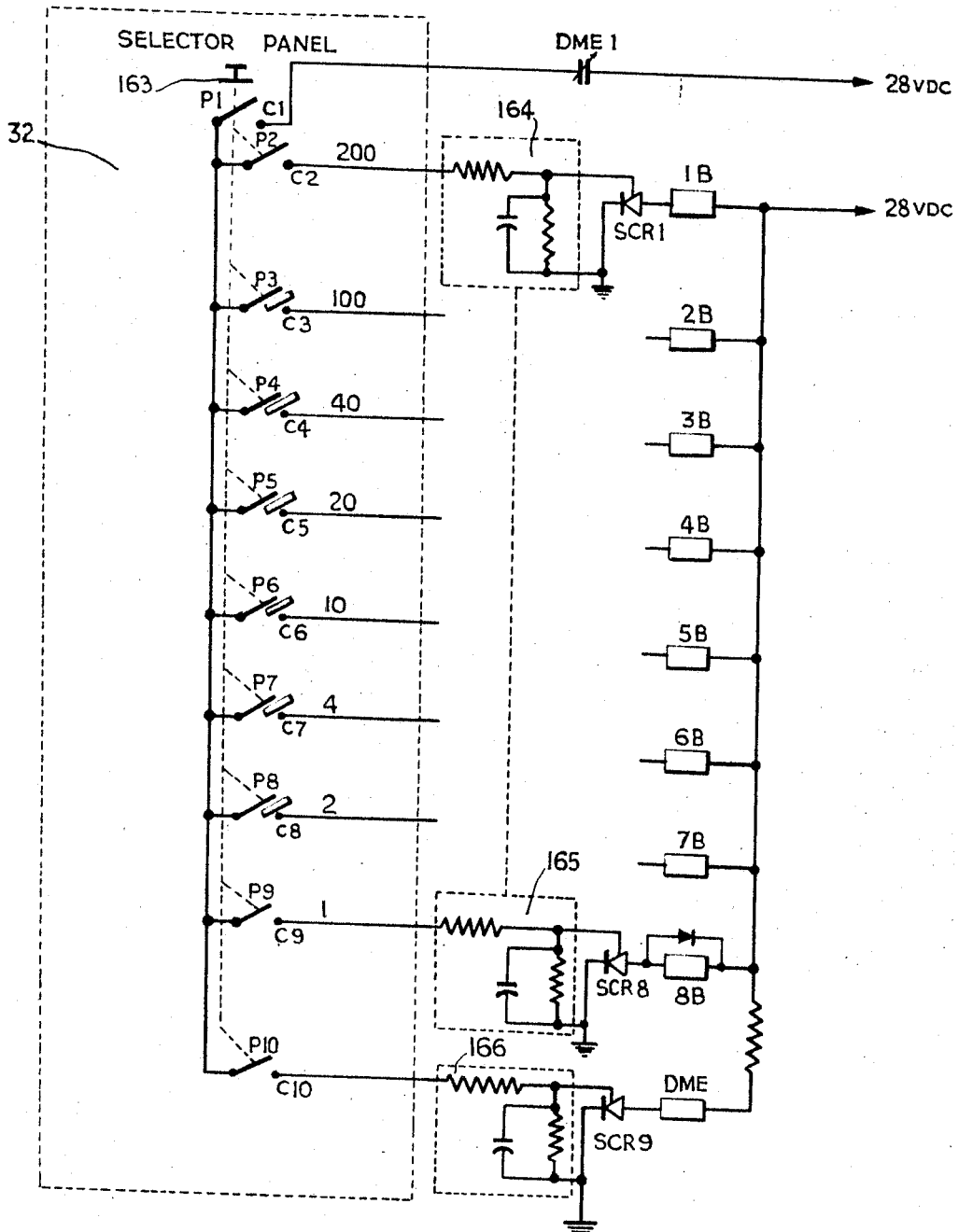
FIG. 13 is a schematic wiring diagram of a symbol selector switch and binary relay section.

For a general understanding of the invention, reference may be had to FIGS. 1 through 11 wherein the various parts comprising the drafting device are shown assembled and in detail. The mechanical operation is discussed herein; the electrical circuits are considered later under operation.

In FIG. 1, the apparatus of the present invention is shown to comprise two units, namely, a symbol selection console 30 and a photographic unit 31 in which the schematic diagrams are prepared. The two units are connected by an electric cable (not shown). In the following description, it is assumed that the apparatus is being used specifically for preparing electrical schematic diagrams; therefore, references to symbols will include electrical symbols as well as alpha-numeric characters. Other types of drawings which can be constructed by the present apparatus are: wiring diagrams, harness assembly drawings, charts, nameplates, logic diagrams, standards drawings and the like. For our purposes, all of the above will be encompassed by the generically used term "diagram."

The symbol selection console 30 includes a selector panel 32 upon which are mounted 256 pushbuttons representing as many symbols, arranged in a 16 x 16 array. This number of symbols has been found sufficient to construct most types of diagrams although more symbol pushbuttons may be added to the selector panel as required. The pushbuttons are easily removed from their receptacles permitting substitution of symbols as diagram requirements dictate. Depression of a pushbutton will cause an image of the symbol represented on the pushbutton to be projected onto the viewing screen 33. Screen 33 may be marked in cross-section fashion to facilitate the preparation of a schematic diagram by enabling the operator to better judge the location and spacing of symbol images and lines. A sketched-out diagram on a translucent layout sheet may also be mounted on the screen to aid in the preparation of the diagram.

Located behind screen 33 will be the photographic material on which the diagram is to be "drawn." This material includes a sensitized emulsion on which a latent image of the diagram will be formed. A second emulsion will provide a visible image of the diagram as its preparation progresses, thereby serving as a guide to the operator. The two emulsions may be on separate base sheets which are then mounted behind the screen as individual sheets or as part of a web of photographic material. Alternatively, the two emulsions may be placed on a single base sheet in layered fashion. Kodak Repro-paper material and Ansco Day-neg material has been found satisfactory.

When a pushbutton is depressed at the selector panel, an encoded signal is sent to a diode matrix in the photographic unit 31. This signal is decoded to locate the desired symbol and cause it to be projected on the viewing screen. (A detailed explanation of the switching and encoding-decoding circuits is provided later in this specification.) The symbol to be projected is stored on a glass slide which, in turn, is housed on a circular magazine in the photographic unit. The slide is removed from the magazine in response to the decoded signal and placed in an optical path.

Light is passed through the slide causing the image of the symbol impressed therein to be projected onto the viewing screen. The projected light passes through a red-tinted plastic shutter before it reaches the screen and, since the photographic film is insensitive to red light, no exposure takes place initially. Controls located on the control panel 34 enable an operator to move this symbol image to any position on the viewing screen 33; rotate it to a desired angle and double its size. When the image is in its desired location, an "expose" switch is depressed causing the shutter to rotate out of the path of the projected light and cause the exposure of the image on the photographic film and the image retention paper.

There is also provided a line drawing capability permitting lines of different types, lengths and widths to be constructed, positioned and exposed. Lines may be connected together or extended to join symbols or other lines.

FIG. 2 shows the apparatus whereby the symbol optical projection components and the line drawing mechanism are moved horizontally and vertically so that the symbols and lines may be placed at any desired position on the viewing screen 33. A description of the electrical circuits controlling this apparatus is contained in a later part of this specification.

Carriage 35 supports the line drawing mechanism 36 and U-shaped member 37, the latter supporting the optical components used to project a symbol image onto photographic film 40 and viewing screen 33. Carriage 35 moves vertically on vertical lead screws 41 and 42 by means of threaded bores through both ends of the carriage. The vertical lead screws are attached, at their upper extremities, to blocks 43 and 44 which slide along upper guide bar 45. Upper guide bar 45 is attached to, and is supported by, stanchions 46 and 47. Vertical lead screws are attached, at their lower extremities, to member 50 which rides on horizontal lead screw 51 by means of a threaded bore through the body of the member. Horizontal lead screw 51 is attached to, and supported by, stanchions 46 and 47.

Since the optical components and the line drawing mechanism are both attached, through their supports, to carriage 35, movement of the carriage in either a vertical or horizontal direction will necessarily cause the same movement to be imparted to the symbol and line making components. The motive power for horizontal movement is supplied by low speed motor 52 and a high speed motor (not shown). (A two-speed motor can be substituted, if desired.) The shaft of motor 52 is coupled to, and drives, horizontal lead screw 51 through a drive belt and pulley 53 (or any similar coupling device). Horizontal lead screw then rotates in a direction dependent on rotation of motor 52 and advances member 50 (and of course carriage 35) either to the right or left.

The motive power for vertical movement is supplied by low speed motor 54 and a high speed motor (not shown). The shaft of motor 54 is coupled to, and drives a transmission bar 55 through a drive belt and pulley 56. Transmission bar 55 supported by bars 57 and 60 transmits its motion to vertical lead screws 41 and 42 through bevel gears 61 and 62. Carriage 35 will then advance either up or down depending on the rotation of the vertical lead screw.

Since two sets of motors are used, vertical and horizontal carriage movement can be obtained simultaneously, enabling an operator to quickly position a symbol or line by using the appropriate controls at the control panel. Carriage 35 may be driven at a fast rate (by the high speed motors) or at a slow rate or even in increments of 0.025, 0.100 and 0.125 inch by low speed motors 52 and 54. This feature permits a symbol or a line to be quickly moved about on the screen to a point near its final desired position at which time a finer positioning can be employed.

The optical components used to project a symbol onto the viewing screen are shown schematically in detail in FIG. 3. Assume that a symbol (here that representing a photoelectric cell) has been selected at the selector panel and the slide 63 associated with this symbol has been removed from slide magazine 64; optical projection occurs as follows: Light from a high pressure mercury arc lamp 65 passes through a condenser lens 66 which distributes the light relatively evenly over the area directly in front of the lens and, particularly, over and through slide 63. The slide comprises a glass base upon which a symbol is formed as a negative photographic image. The slide has been selected from magazine 64 which carries up to 256 slides and which may be rotated to permit any desired slide to be selected for positioning in the light path. As the light proceeds through the slide, a collimating lens 67 directs the light through a Dove prism 70 which can be rotated about a longitudinal axis thereby causing rotation of the projected symbol image. The prism 70 (FIGS. 4 and 5) is mounted in a rotatable housing 71 attached to support 72. The housing is driven by motor 73 acting through a gear pinion 74 slideably mounted on the motor shaft and a ring gear 75 on the prism housing. When the "rotation" switch is depressed at the photographic unit control panel, the clutch solenoid 76 is actuated, causing pinion 74 to slide on the motor shaft and engage gear 75 of the prism housing. At the same time, detent solenoid 77 is actuated, detent bar 80 is displaced, and detent pawl 81 is removed from housing ring gear 75, thereby permitting housing 71 to turn freely as motor 73 is energized. The prism (and hence the symbol image) will rotate as long as the "rotation" switch remains depressed; when the switch is released, the housing will either be stopped instantly or forced to continue its travel to some multiple of 15°. (These two modes of rotation are described in detail under electrical description.) In either case, upon release of the rotation switch, solenoid 77 is deenergized, bar 80 is returned to its former position by spring 82 and pawl 81 engages gear 75. At the same time, solenoid 76 is deenergized decoupling motor 73 from the housing.

Referring again to FIG. 3, the light, after passing through Dove prism 70 enters telescope 83. The telescope 83, as shown in FIG. 4, is mounted on shaft 84 which is contained within telescope housing 85. The housing in turn is secured to support 72. The telescope is capable of being rotated 180° about an axis perpendicular to its optical axes, by motor 86. In its normal position, motor 86 continuously urges the telescope housing against a stop (not shown) and the image projected by the telescope in this position is twice the size of the symbol impressed on the slide. When the image size is to be magnified, the "magnification" pushbutton at the control panel is depressed causing power to be applied to the windings of motor 86 so as to reverse the phase relationship of the windings and drive the motor in the reverse direction. The motor transmits its shaft rotation through the motor gear 87 and pinion 90 to housing 85 causing the housing to rotate 180° where it is halted by another limit stop (not shown). In this position, the image projected by the telescope is four times the slide symbol size.

In FIG. 3, the normal (or magnified) image is directed from the telescope 83 to mirror 91 where it is bent 90° and passed through decollimating lens 92 which focuses the light on the viewing screen 33 and film 40. Before reaching screen 33, the light passes through red-tinted shutter 93. Since the photographic film is insensitive to the red light passed by the shutter, exposure of the symbol does not take place immediately. The symbol image can be moved about on the screen and rotated or magnified; when it is in its final position, the "exposure" switch is depressed and the shutter rotates out of the optical path for a sufficient interval of time for the now direct light from lamp 65 to expose the image on film 40. If desired, two light sources may be used, one of low level intensity for 'set up" purposes and another of sufficient intensity to expose the film when the image is finally positioned.

Exposure time is approximately one second but a longer time is required if the symbol image has been magnified.

In the foregoing manner, any number of symbols can be positioned and exposed. There only then remains the "drawing" and exposure of any linework involved. This line drawing feature will now be discussed.

FIG. 6 presents a schematic exploded view of the components of the line drawing mechanism while FIGS. 7 through 11 show the preferred embodiment of the mechanism.

Referring to FIG. 6, a red fluorescent lamp 94 is placed behind, and light from it passes through, left end line control film strip 95, right end line control film strip 96, line type film strip 97, and width plates 100 and 101. The path of this light is successively blocked, in part, by each film strip and the plates, and the portion of light that survives to fall on film 40 and screen 33 determines the character of the line. Film strips 95 and 96 are half opaque and half transparent. Adjusting the longitudinal position of strip 95 controls the position of the left end of the line while adjusting the longitudinal position of the other strip 96 controls the length of the right end of the line. It is seen then that these strips are made to act as a shutter and control the amount of light falling on line type film strip 97.

Film strip 97 (shown in detail in FIG. 10) is punctuated by transparent portions consecutively laid out so as to form different types of lines (for example, solid, dotted and broken). The film strip is shown in FIG. 6 rotated to a point where rectangular "windows" are wholly in the light's path; these "windows" produce a dotted line effect on the viewing screen. (The joining of such a line to a symbol is shown in FIG. 3.) Continued rotation of the strip will cause the other types of line to come into view. The width of this line is determined by the variable distance between two parallel plates 100 and 101.

Now that the character of the line has been set, the line bar mechanism can be positioned so that a line can be drawn anywhere upon the screen. The same apparatus is used to move the line bar mechanism that positioned the optical projection components. The line drawing mechanism can also be rotated about hinges 102 (FIG. 2) thus permitting a line to be "drawn" at any angle.

When the line is finally composed and positioned, a solenoid (not shown) is energized in response to an operator control signal and jams film strips 95, 96, 97 and plates 100 and 101 against photographic film 40. The "expose" switch is then depressed and a white fluorescent lamp (not shown) goes on; its intensity overrides the red light from lamp 94 and contact-exposes the line formed on the film. Other methods for exposure may be used including single lamps providing a low level intensity during setup and a higher exposure level after setup and viewing lamps of other colors in combination with a flash-type lamp.

FIGS. 7, 8 and 9 show the preferred embodiment of the line drawing mechanism. Referring to FIGS. 7 and 8, the line drawing components are housed in a light-tight enclosure 36. Light from red fluorescent lamp 94 and, during exposure, light from white fluorescent lamp 104, is directed through line control film strips 95 and 96 and line type film strip 97 to an aperture between plates 100 and 101 onto the front end of enclosure 36 and onto the photographic film and viewing screen (not shown).

The line type film strip 97 is wound on line type supply spool 105 at one end of enclosure 36, stretched the length of the enclosure across roller guides 106 and 107 and wound into takeup spool 110. In this position, an entire section of the strip, nearly equal in length to the enclosure length is situated in front of lamps 94 and 104 resulting in a line being formed at the viewing screen whose length is equal to the length of the section. This line may be shortened by the action of film strips 95 and 96 and its width may be altered as hereinafter described.

Spool 105 is driven by reversible line type drive motor 111 in either rotational direction in response to operator control signals until the desired type of line is positioned in front of the lamps. Tension on film strip is maintained by the action of unidirectional tension motor 112. This motor, energized at the same time as motor 111, will continually drive shaft 113 and roller member 114 attached to the shaft, in the same direction by means of bevel gears 115. Belt 116, wound around one end of member 114, drives takeup spool 110 in the takeup direction; belt 117, wound around the other end of member 114, drives supply spool 105 in the reverse takeup direction. When film strip 97 is being driven in the takeup direction, drive motor 111, although meeting resistance due to the action of tension motor 112, overpowers the action of that motor and drives takeup spool 110 in the takeup direction. This opposition ensures that any slack in the film will be taken up. When the film direction is reversed, motor 111 feeds the film strip to supply spool 105 but at a slower rate than that at which the spool is driven by motor 112 and the strip is again kept taut.

The end of line control strips are shown in FIGS. 7 and 8 to be of the endless type wound over and around rollers, motor-driven shafts and tension members. Left end control strip 95 is driven in either direction by left end motor 120. The strip is fitted snugly around member 121 which is keyed to shaft 122. As motor 120 is made to rotate, its motion is transmitted to shaft 122 and member 121 by means of bevel gears 123. Strip 95 will be forced to rotate away from member 121 due to the action of friction between them. (A sprocket arrangement may also be used to achieve this rotation.) Assuming rotation to be clockwise (as viewed on FIG. 7), the strip passes over rollers 124 and 125 and across roller member 126 which is attached to shaft 127. Member 126 revolves around shaft 127 with a minimum of friction due to the action of ball bearings 130. The strip is kept taut by being made to pass over tension rollers 131 and 132, tension member 133 and tension roller 134.

Right end control strip 96 is driven in either direction by right end motor 135. The strip is fitted snugly around member 136 which is keyed to shaft 127. As motor 135 is made to turn, its motion is transmitted by means of bevel gears 137. Strip 96 will be forced to rotate away from member 136 due to the action of friction between them. Assuming rotation to be counter clockwise (as viewed on FIG. 7), the strip passes over rollers 140 and 141 and across roller member 142 which is attached to shaft 122. Member 142 revolves around shaft 122 with a minimum of friction due to the action of ball bearings 143. The strip is kept taut by being made to pass over tension rollers 134, tension member 144, tension rollers 145 and 131.

Motors 120 and 135 are reversible stepping motors; they can be controlled by the operator to drive their respective film strips in either direction at a coarse (fast) rate; at a fine (slow) rate; and at a moderate rate. This variation in speed permits an operator to quickly adjust a line to approximately its desired length and then obtain an exact joining of the line to a symbol or another line.

FIG. 8 shows the mechanism for altering the width of the line being composed. The gap between two moveable parallel plates 100 and 101 sets the width of the line formed on the screen and is determined by the angular position of cams 146 and 147. Springs 150 and 151 force plates 100 and 101 to bear equally against cams 146 and 147 with the instant point of pressure being applied to the cams by rigid follower members 152 and 153. Synchronized stepping motors 154 and 155 (FIG. 7), in response to a width control signal by operator, causes the cams to rotate in unison to one of six different positions; at each position the cams exert an outward thrust on plates 100 and 101 through members 153 and 152 resulting in six different increments of separation between the plates. FIG. 11, a detailed view of one of the cams, shows the cam at a position where, if translated in the same plane to its normal mounting position, it would produce a plate separation (and hence a line width) of .010 inch. Other positions marked on the cam shown in FIG. 11 indicate the width obtained when the cam is stopped to that position. It is obvious that the width of a line can be increased or decreased beyond the present limits of the invention by using cams provided appropriate angular deflections.

Having described the mechanical components of the apparatus, attention will now be directed to the electrical circuitry employed to operate these components. The circuitry will be described in conjunction with a detailed description of the apparatus in operation.

Prior to operating the mechanism, an operator can secure his rough, scaled layout of the drawing to be composed in any convenient location. This can be on the viewing screen so that a projected image can be brought into coincidence with the corresponding symbol on the layout sheet. This sheet may be on cross-section paper having 8 or 10 divisions to the inch so as to accommodate itself to the invention's ability to position lines or symbols on the viewing screen to .25, .100, .125 or .500 inch centers. The photographic material is then installed and the mechanism is ready for use.

The basic power requirement for the equipment is a 115 v. AC, 60 cups. source. This power is required to energize motors, solenoids, lamps and relays. Additional power requirements of 9 v. AC, 30 v. DC and 28 v. DC can be provided by use of appropriate step-down transformers and bridge rectifiers.

Referring to FIG. 12, a desired symbol is selected by depressing the appropriate pushbutton on selector panel 32 located on symbol selection console 30. Directly beneath each pushbutton is a binary code reference designation which corresponds to an address number of a symbol slide in the slide magazine. When a symbol pushbutton is depressed, a unique combination of normally open switches is closed causing corresponding relays to be energized. The position of these relays, eight in number, determine the address number. In order of significance each relay, when energized, will encode the address numbers of 200, 100, 40, 20, 10, 4, 2 and 1 and combinations thereof, making available 256 discrete addresses. These addresses, by the nature of the binary levels, cannot form a number ending in eight or nine.

This coded number is "held" by the relay storage circuits 156 and decoded by the diode matrix 757. Signals from the matrix to the magazine servo drive circuit 158 and the commutator 160 cause the slide magazine 64 to rotate until the desired slide is in position to be presented. Presentation of the symbol is accomplished by picker assembly 161 which removes the symbol slide 63 from slide magazine 64 and places it in the optical projection path.

Since each of the 256 pushbuttons on the selector panel operate through identical switching sections and binary relay circuits, the operations of one only will be discussed. Referring to FIG. 13, assume that the letter A is to be projected and exposed; that the letter has been assigned an address number of 201, and that pushbutton 163, when depressed, will cause this number to be encoded by its associated switch section and relay circuit. Upon pushbutton 163 being depressed, poles P1 through P10 will touch the "make" contacts C1 through C10 unless prevented from doing so by an insulator. Two contacts, C1 and C10, are not insulated in this or any other switch section; C1 closes a DC path to the switch section while C10 energizes diode matrix enable relay DME. The state of the remaining eight sections; that is, whether a closed path is created for energizing any of relays 1B through 8B or whether the path remains open and the relays stay deenergized, determines the address number (or binary code) used to select a desired symbol. In our specific example, when switch 1863 is depressed, +28 v. DC is applied through contacts DME1, contacts C1 (always open) to the binary 200 level contact C2 and the binary 1 level contact C9 through poles P2 and P9 respectively. All other contacts are insulated presenting an open path to this voltage. The positive voltage is applied from contacts C2 and C9 to voltage dividers 164 and 165 on the binary 200 and 1 levels, respectively. These voltage dividers produce a sufficient gate voltage to turn on silicone controlled rectifiers SCR1 and SCR8 thereby closing a ground path to energize binary relays 1B and 8B. (For other pushbuttons, other combinations of open or closed paths through the switch sections are possible so that each pushbutton will cause the energization of a unique combination of relays 1B to 8B.)

At the same time that the binary relays are being energized, switch contact C10 has applied the positive input voltage to voltage divider 166 which, in turn, has provided a postive gate voltage to silicon controlled rectifier SCR9 turning the rectifier on. The ground path for the diode matrix enable relay DME is then complete and the relay is energized. This relay is energized whenever any pushbutton is depressed. Contacts DME1 open removing the 28 v. DC input from the switch section. Relays 1B and 8B will remain energized because their associated silicon controlled rectifiers SCR1 and SCR8, due to inherent characteristics, remain on and maintain a holding circuit for these relays.

Figure 14:
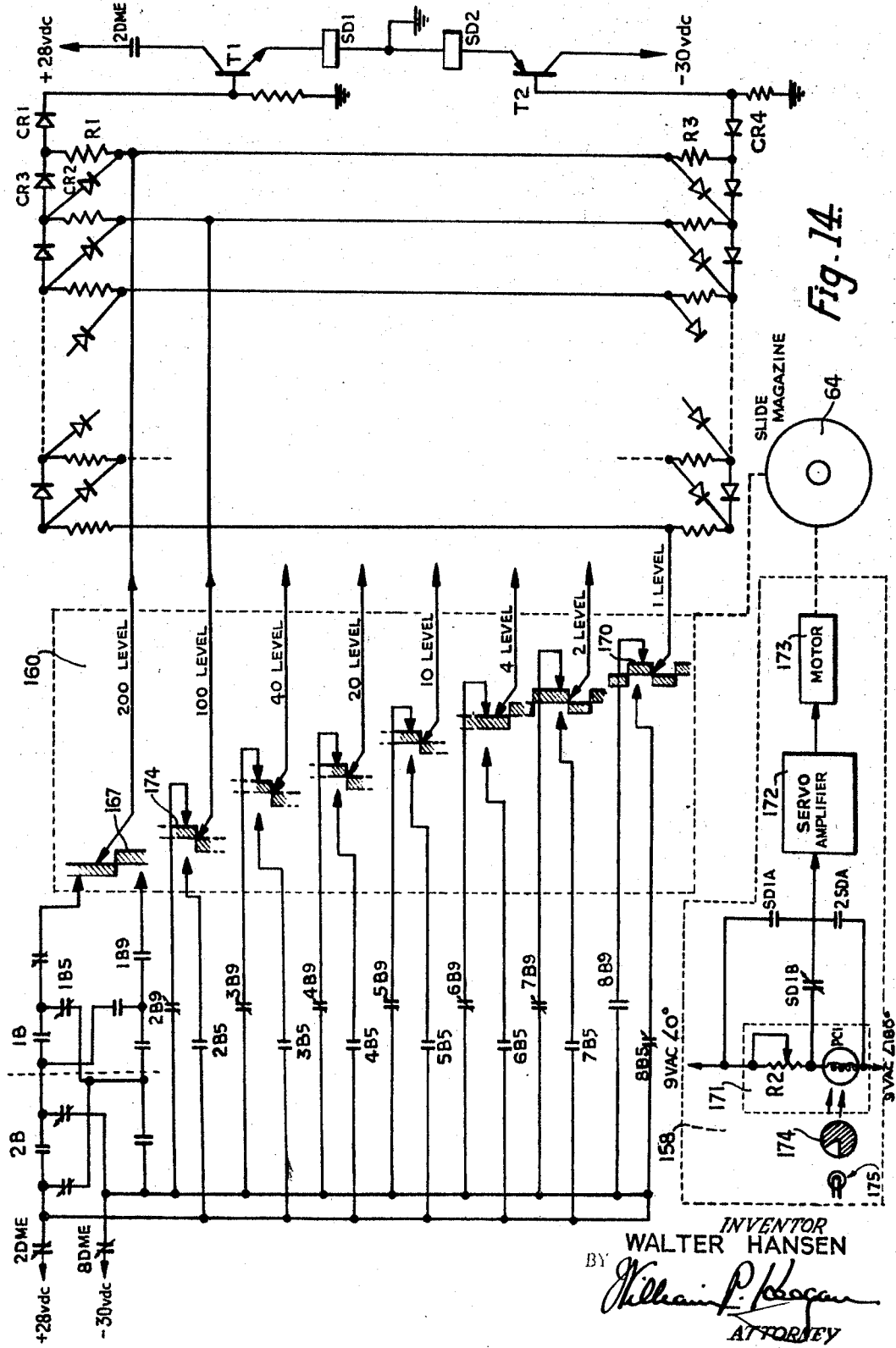
FIG. 14 is a schematic wiring diagram of the decoding logic circuit and the servo drive circuit.

Referring to FIG. 14, when relay DME was energized, contacts DME2 and DME8 closed applying +28 v. DC and −30 v. DC to contact 1B5 to 8B5 and contacts 1B9 to 8B9 respectively of each binary relay. If a binary relay has been energized, its B5 contact is closed, its B9 contact is open and +28 v. DC is applied to commutator 160. If the binary relay has not been energized, the B5 contact is open, the B9 contact is closed and −30 v. DC is applied to the commutator. The commutator is a printed circuit disc which is concentric with, and attached to, slide magazine 64 (FIGS. 2, 3). A portion of the commutator (approximately 1/16 of its total area) is shown in FIG. 21.

Figure 21:
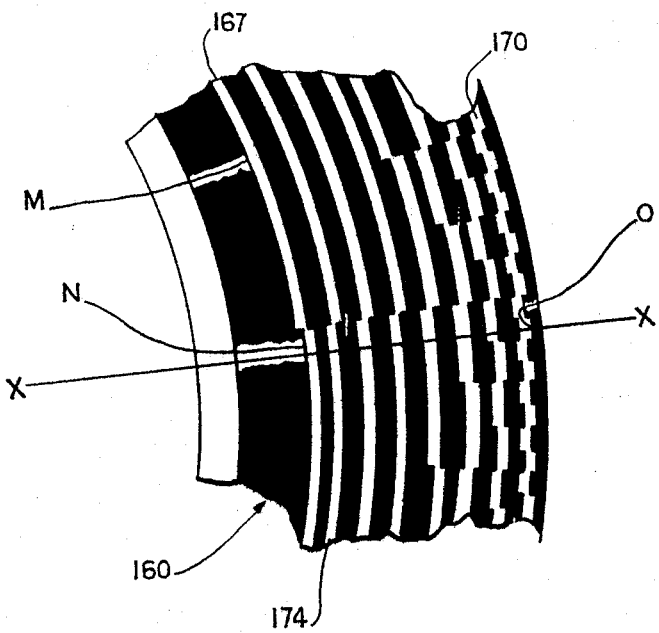
FIG. 21 is a schematic diagram of a portion of the commutator disc.

Referring to FIG. 21, eight conductive rings, each associated with a binary level, are imprinted on this ring in a disjointed (upper lower) pattern. The rings form a binary program in the orientation of their segments: ring 167 has two segments, ring 174 has four segments; the rings generally progress upward through 8, 16, 32, 64, 128 and finally ring 170 with its 256 segments, each one of which corresponds to a unique slide magazine position.

The voltages applied through the binary relay contacts terminate in eight sets of brushes attached to line X—X which alternately wipe the upper and lower segments of each of the eight rings. A third brush wipes each ring continuously and feeds an output voltage to the diode matrix (see FIG. 14) associated with that ring. The function of this matrix is to "read" the output of all eight rings (or levels) one at a time in descending order, the order of "reading" being maintained by having the voltage on higher levels inhibit the effect of voltages on lower levels.

Continuing with our example and referring to FIGS. 14 and 21, binary relays 1B and 8B having been energized, contacts 1B5 and 8B5 are closed and +28 v. DC is applied through these contacts to the brushes wiping the upper (left) segment of the first (or 200 level) ring 167 and the right (or 1 level) ring 170. The output brush at the 200 level ring detects the positive voltage and applies it through resistor R1 to diode CR1. Blocking diodes CR2 and CR3 prohibit this voltage from affecting the other diode matrices. Diode CR1 conducts and forward biases transistor T1 causing it to conduct heavily and thereby energize servo drive relay SD1 whose contacts control the operation of the magazine servo drive circuit 158. This circuit consists of a variable resistor bridge 171, servo amplifier 172 and two-phase motor 173. The variable resistor bridge, consisting of resistor R2 and photocell PC1 introduces a fixed phase control voltage to the servo amplifier when one of the servo drive relays SD1 or SD2 has been energized. Servo amplifier 172 drives motor 173 by applying a reference voltage to one motor winding and by amplifying an input control voltage and producing an output voltage of varying phase which can be applied to the other motor winding to control rotation of the motor. The motor is made to rotate and drive slide magazine 64 (and commutator 160 attached to it) in the same rotational direction until the slide magazine is in the position where the desired slide can be presented.

Before a servo drive relay is energized, the resistance of photocell PC1 is equal to the resistance of R2 and the output from both sides of the bridge is balanced. The input to amplifier 172, taken from the center of bridge 171 and through normally closed contacts SD1R will be zero. The amplifier is at a null and the motor is deenergized. When relay SD1 was energized, as previously described, contacts SD1B opened and SD1A closed. Resistor R2 is effectively shorted out as the fixed phase positive voltage is applied to amplifier 172 through contacts SD1A. The phase of the amplifier output voltage to motor 173 causes counterclockwise rotation of the motor in this case. (Clockwise rotation will occur when relay SD2 is energized.) The motor will drive slide magazine 64 (and commutator 160 attached to it) counterclockwise as long as any output brushes on the commutator are contacting a conductive ring segment. Referring to FIG. 21, assume that when rotation began point M was lying on the X—X line ( along which the brushes are aligned). Since the upper segment of ring 167 is being contacted by the +28 v. DC brush, the commutator will rotate counterclockwise until no voltage output is detected on the ring by the output brush. This occurs when point N is opposite line X—X since there the upper segment of ring 167 is discontinued and only the lower segment, which has no voltage on it, is being contacted by a brush. At this point, the 200 level has been "read" and the commutator and slide carriage have been moved significantly closer to their final position. The 100 level ring 174, the next to be "read," had initially been at a −30 v. DC potential at point M through contact with the −30 v. DC brush on the bottom segment of the ring. But this level was inhibited then because, as shown in FIG. 14, the +28 v. DC on ring 167 had dropped across resistor R3 and diode CR4 and appeared at the base of transistor T2 keeping it turned off. Now, when point N is opposite the brushes, the lower segment of ring 174 has been discontinued, the −30 v. DC brush, even though still "live" is making no conductive contact while the +28 v. DC brush, which is making contact with the upper segment, is not "live." The output of ring 174 therefore is zero and the commutator will not be rotated. In fact, observing the rings in FIG. 21, the bottom segments of all eight rings have been discontinued since the commutator rings are so situated that all segments having voltages opposite in polarity to that of the first ring read, will be rotated out of contact with their brushes. Since all the rings in our example were at a potential of −30 v. DC except rings 167 and 170, the next ring upon which a brush is still impressing a voltage is ring 170. This ring is read in the manner as ring 167 and the motor 173 continues to drive magazine 64 counterclockwise until the output from the 1 level is zero.

Referring again to FIG. 14, since all output brushes now read zero, transistor T1 is turned off, relay SD1 is deenergized opening contacts SD1A and closing contacts SD1B. The input voltage to servo amplifier 172 is again applied from the center of bridge 171. However, the bridge is not balanced as it was initially because the resistance of photocell PC1 has been altered during the magazine rotation and a small input voltage to the amplifier still causes the amplifier to continue to drive motor 173. The shaft of motor 173 is geared at a ratio of 1 to 1 to a continuous-tone, shaded disc 174 mounted on its shaft which modulates light from lamp 175 to photocell PC1. The motor shaft is also geared so that one revolution of the motor shaft (and of course the attached disc) corresponds to 1/256 of a rotation of slide magazine 64. The shaded disc has only one stable position on the motor shaft; viz; at the point where light through the disc is at the level required to balance the resistance of photocell PC1 to the calibrated resistance of potentiometer R2 in the other half of bridge 171. Thus, although the motor has rotated the slide magazine to the approximate location for the slot containing the "A" symbol slide to be selected and projected, it must continue rotating through some portion of one revolution (1/256 of a magazine revolution) until the output from both sides of the bridge is exactly balanced (no input to the servo amplifier). The servo amplifier is then at a null, motor 173 will stop driving the slide magazine and the magazine will be stopped exactly at the right point for the "A" symbol slide to be presented (point O in FIG. 21). This null condition may be achieved at each of the 256 unique positions of the magazine.

In order to minimize slide magazine rotation, contacts of relay 1B and 2B may be cross coupled as shown in FIG. 14 to reverse the polarity of the 200 level line if both relays have been energized. The arrangement prevents more than 270° rotation of the magazine so that a newly selected slide is brought into photographic position in the shortest possible time.

Once the symbol has been selected and placed in the optical path, it is projected onto the viewing screen as previously described. The symbol image will probably not be in its desired location in relation to the schematic diagram to be drawn so the present invention employs a horizontally and vertically travelling carriage system to carry the optical (and line making) apparatus. Switches on the photographic unit control panel, when depressed, cause horizontally travelling member 50 (FIG. 2) to be driven right or left, or the vertically travelling carriage 35 to be driven up or down; hence a symbol (or line) may be positioned anywhere on the viewing screen (and, of course, the photographic material behind the screen).

Figure 15:
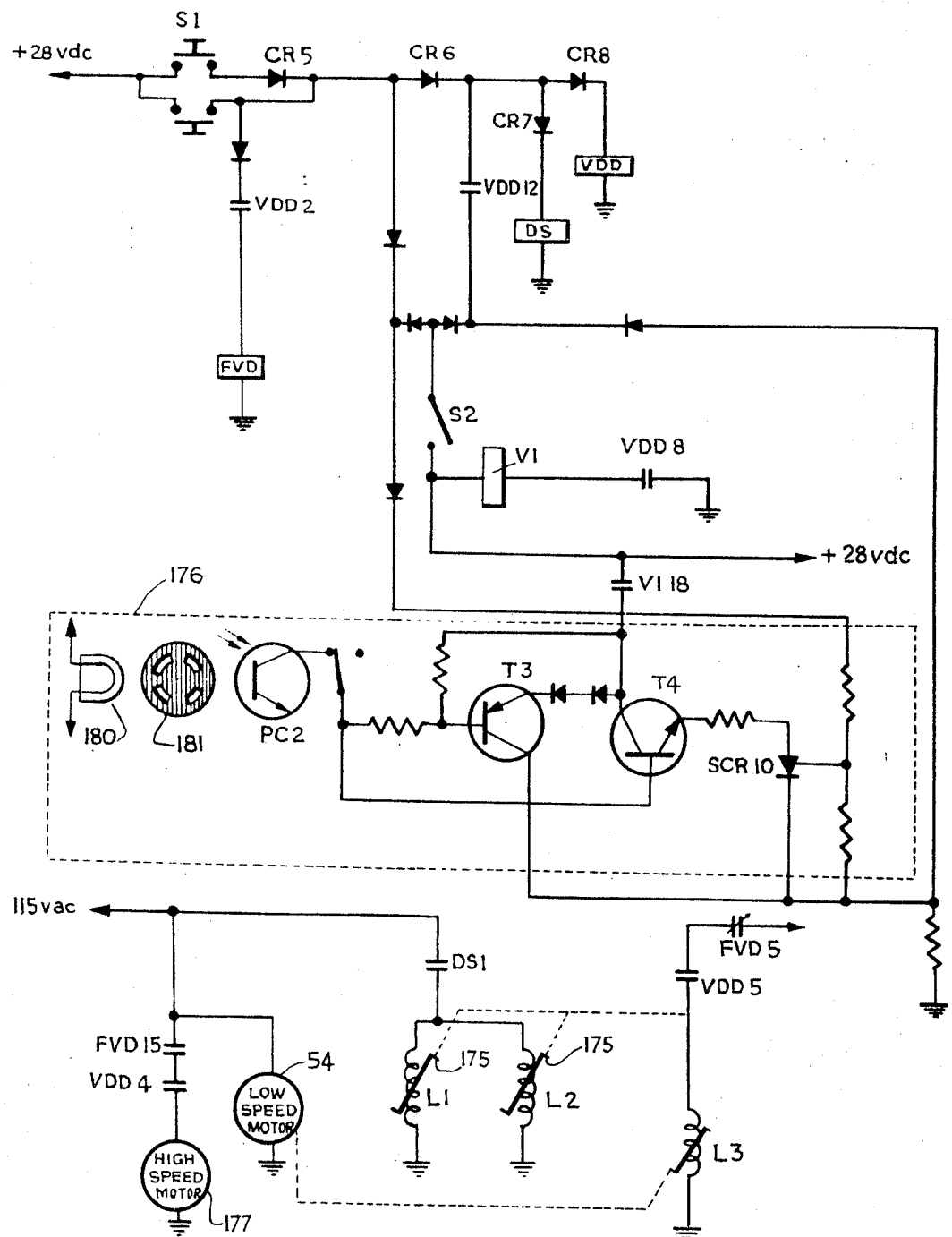
FIG. 15 is a schematic wiring diagram of the circuits used to position symbol images and lines on the viewing screen.

The mechanical functions of this positioning system have been previously described. FIG. 15 shows the electrical circuits required to drive the horizontal member or the vertical carriage. Since the circuits used to create vertical movement are the same as those creating horizontal movement, only one, the vertical, will be discussed here. Assuming that a projected symbol on the screen is an appreciable distance directly above its intended location, the following discussion will consider the circuits required to drive the vertical carriage first at a high rate of speed until the carriage is 1½ inches from its desired location; then at a slower rate of speed, and finally in .125 inch increments.

The rates and increments of travel are selected at the control panel. The ratio of high speed to low speed in the present invention is 7:1, incremental travel of 0.025, 0.100 in addition to 0.125 inch are available. This velocity ratio can be altered in other embodiments; likewise different incremental movements can be obtained as described later.

Referring to FIG. 15, when drive fast switch S1 is depressed, detent solenoid relay DS and vertical drive down relay VDD are energized and silicon controlled rectifier SCR10 is forward biased and turned on. Contacts DS1 close applying 115 v. AC to solenoids L1 and L2 causing them to disengage clamps 175 from a detent mechanism (not shown). This detent mechanism can be a five point star wheel pinned to the drive shaft of motor 54 (FIG. 2). Transmission bar 55 (and vertical lead screws 41 and 42) may then be driven incrementally or continuously depending on whether the detent mechanism is engaged or disengaged, respectively.

Vertical increment relay VI and fast vertical drive relay FVD are energized through now closed contacts VDD8 and VDD2, respectively. Contacts VI18 close applying a positive voltage to the increment sensing circuit 176 described later in detail. Contacts FVD5 open disconnecting power from solenoid L3 causing slow speed motor 54 to decouple from the vertical transmission bar 55 (FIG. 2). This motor is continuously powered and turns at a low synchronous speed. Contacts FVD15 close applying 115 v. AC through contacts VDD4 to high speed motor 177. This motor is permanently coupled to the transmission and, during slow speed, merely represents an additional load on the transmission. However, since slow speed motor 54 has been decoupled from the transmission, motor 177 now supplies the vertical carriage drive power. The motor's rotation may be transmitted by means of bevel gears to the vertical lead screws 41 and 42 (FIG. 2) which turn in a direction causing the vertical carriage to descend.

When motor 177 accelerates to a predetermined speed, centrifugal switch S2 closes. This has the dual effect of creating a holding circuit for relays DS and VDD and of maintaining a forward bias on silicon controlled rectifier SCR10.

The vertical carriage will continue to descend at a fast rate until the operator releases switch S1. This opens the +28 v. D.C. circuit and deenergizes relay FVD; relays VDD and DS remain energized because of the holding circuit previously established. Contacts FVD15 open removing power from motor 177 disengaging it from the drive gears. Contacts FVD5 close completing a +28 v. DC circuit to L3 through contacts VDD5. Actuation of L3 recouples low speed motor 54 to the drive shaft and causes the transmission bar to slow its rotation to the speed at which centrifugal switch S2 originally closed whereupon the switch reopens. With S2 open, the forward bias is removed from SCR10. The diode may or may not continue to conduct depending on the state of the increment sensing circuit consisting of cell PCC2, and transistors T3 and T4.

Photo diode cell PC2 views lamp 180 through a slotted disc 181 mounted on the transmission drive shaft. The slots, four in number, are spaced equally in a concentric row; the angular distance between adjacent slots represent .125 inch linear travel of the vertical carriage. If lamp 180 is blocked out at the instant switch S1 is released, the following situation exists: PC2 is off since it only conducts when light through a slot falls on it. The bases of transistors T3 and T4 are maintained at a positive potential through contacts VI18; transistor T3 is not sufficiently forward biased to conduct but transistor T4 does conduct providing a sufficient forward bias on SCR10 to keep it turned on. Thus, a holding circuit is maintained for relays DS and VDD through contacts VI18, transistor T4, and silicon controller rectifier SCR10. This holding circuit will be maintained until disc 181 on the transmission shaft has rotated to the point where lamp 180 is "seen" by PC2 through the next-in-line slot. PC2 will then conduct heavily, driving the bases of transistors T3 and T4 to ground. Transistor T4 becomes reverse-biased and is cut off thereby cutting off rectifier SCR10. Transistor T3 becomes forward-biased and conducts heavily continuing a holding path for relays DS and VDD. As the slotted disc continues to rotate, the light is again blocked to PC2 turning it off. The bases of transistors T3 and T4 will again become positive; transistor T3, being reverse-biased, is cut off. The holding circuit is no longer available for relays DS and VDD and they are deenergized. Transistor T4, although forward-biased by the positive voltage, cannot conduct because its emitter circuit was opened by the cut off of silicon controlled rectifier SCR10 which no longer has a large enough forward-bias to trigger it on.

Upon relay VDD being deenergized, contacts VDD5 open removing power from solenoid L3 which, in turn, decouples motor 54 from the transmission. Upon relay DS being deenergized, contacts DS1 open removing power from solenoids L1 and L2. Spring returned clamps 175 are seated in the detent mechanism stopping the shaft rotation at a .125 inch increment of travel. The symbol image can be advanced in successive .125 inch steps by pressing and quickly releasing switch S1. A .025 or a .100 inch detent circuit can be achieved by mounting concentric discs with 20 or 5 equally spaced slots, respectively, and modifying the .125 inch circuit accordingly.

Once the symbol is exactly positioned in its desired location, it may be required that it be at a different angle than the normal vertical. The symbol may be rotated in any direction, either continuously or in 15° increments, using the circuits shown in FIG. 16. These circuits, modified as described later, may be used to obtain line rotation.

For purposes of discussion, it will be assumed that the symbol is to be rotated 90° counterclockwise. This rotation will be described first in detent operation and then in continuous operation. Referring to FIG. 16, when detent image rotation switch S3 is depressed, 28 v. DC is applied to image rotation relay IR energizing the relay. Contacts IR6 close applying 115 v. AC to one winding of motor 73. The AC power is also applied to a phase shift network 182 which produces a 90° change in phase in the input voltage applied to the other winding of motor 73 causing it to rotate counterclockwise. 115 v. AC is also applied to the clutch solenoid 76 and detent solenoid 77 through now closed contacts IR10. Actuation of solenoid 77 releases a detent bar 80 and a detent pawl 81 (FIG. 2) from the prism housing permitting the housing to be rotated freely. Actuation of clutch solenoid 76 couples motor 73 to a ring gear 75 which drives the prism housing 71 in the symbol projection optical path. The prism, and hence the image projected through it, begin to rotate counterclockwise.

The image will rotate as long as switch 83 is kept depressed. Since it was assumed that a 90° symbol rotation was desired, as this degree of rotation is approached, the operator releases switch S3 deenergizing relay IR and removing power from motor 73. Clutch solenoid 76 is deenergized decoupling the motor from gear 75. Solenoid 77 is deenergized and spring-loaded bar 80 is engaged with ring gear 75 by means of pawl 81. As this pawl seeks home, it mechanically forces the housing to continue rotating until the pawl is seated in its home position. Thus, if switch S3 was released after 75° of symbol rotation (but before 90°), the prism housing will rotate to, and be held at, 90°. Of course, any angle could be achieved provided it is a multiple of 15° (105°, 150°, etc.).

For a continuous rotation to 90° (or any angle from 0° to 360°), the operator first depresses continuous rotation switch S4. 28 v. DC is applied through switch S4 and normally closed contacts IR4 to one winding of motor 73. This voltage is also applied through contacts IR14 to the other winding of the motor. This DC voltage impressed on the motor windings acts as a dynamic brake on the motor holding it (and housing 71) stationary. This condition is maintained until switch S3 is depressed and relay IR is energized causing contacts IR4 and IR14 to open. The DC voltage applied to the motor is removed once the 115 v. AC circuit described above is reestablished. The motor will drive the prism housing as described above until switch S3 is released deenergizing relay IR and again causing contacts IR4 and IR14 to close. The positive voltage is again impressed on the motor windings braking the motor and causing the prism (and image) to stop at the desired angle.

The symbol, now being positioned and placed at the desired angle, is ready to be exposed. As shown in FIG. 3, shutter 93 prevents the light from lamp 65 from reaching screen 33. The following description explains how this shutter is rotated out of the light path for a time sufficient to cause a symbol in the light path to be exposed on the photographic film.

Figure 17:
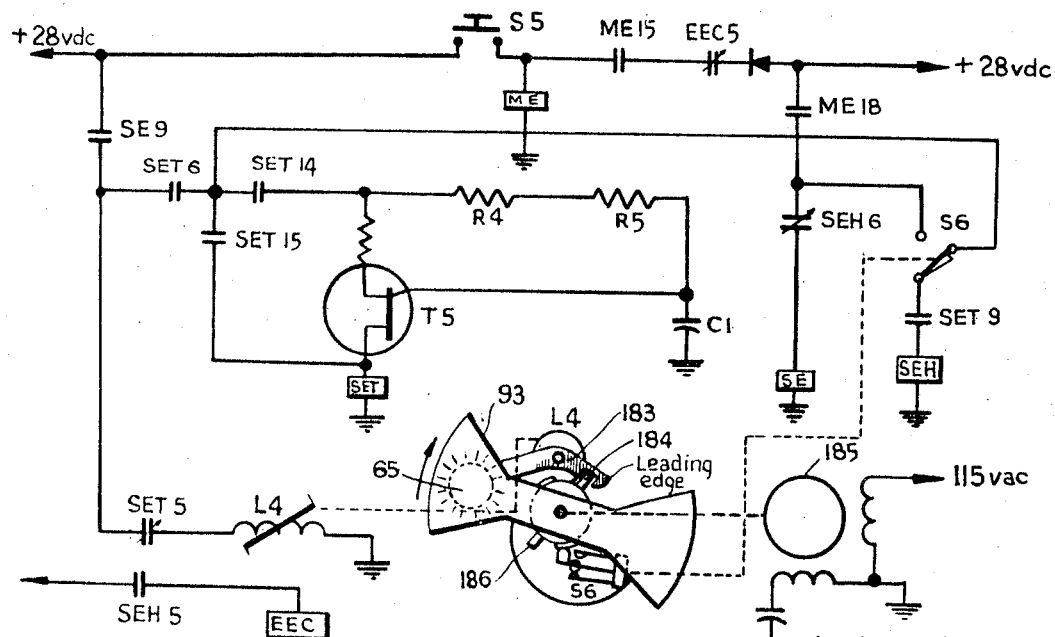
FIG. 17 is a schematic wiring diagram of the symbol expose circuit.

Referring to FIG. 17, when expose switch S5 is depressed, 28 v. DC is applied to manually expose relay ME energizing the relay. Contacts ME15 close completing a holding path for relay ME. Contacts ME18 also close applying 28 v. DC to symbol expose relay SE energizing the relay. Contacts SE9 close completing an energization path to solenoid L4 which, when actuated, unlatches the leading edge of spring-loaded pawl 183 from pin 184. Motor 185 has been continually driving against the shutter and now, with the retraction of the pawl, causes the shutter to begin rotating clockwise. As the shutter rotates, the intense white light from lamp 65 falls on the slide and exposes the projected symbol image. Rotation of the shutter is stayed after 90° when pin 186 engages the trailing edge of pawl 183; the shutter is held in this position for a length of time determined as follows: After the initial 5° of rotation, switch S6 is mechanically actuated completing a 28 v. DC path through contacts ME18 and SET14 to series resistors R4, R5 and capacitor C1. Capacitor C1 charges towards a potential of 28 v. DC at a rate determined by the resistor values. Transistor T5 is subsequently triggered and conducts heavily energizing symbol expose time relay SET. Contacts SET15 then close maintaining a holding circuit for relay SET.

During the time required to energize relay SET, the shutter has rotated 90° and has been stopped, as described above, when the trailing edge of pawl 183 engages pin 186. Upon relay SET being energized, contacts SET5 open removing power from solenoid L4. The trailing edge of the pawl is unlatched from pin 186 by spring action and the shutter, driven by motor 185, continues its rotation until pin 184 is again seated in the slot on the slot on the pawl's leading edge. By this time the second arm of the shutter has been rotated into position to block the light. As the shutter nears the end of this second 90° rotation, switch S6 is actuated and symbol expose holding relay SEH is energized. Energization of this relay initiates the end of the expose cycle involving relays SE and end expose cycle relay EEC. The apparatus is now ready for selecting and exposing another symbol, as described above, or selecting and exposing a line as hereinafter described.

The above paragraphs have primarily discussed the selection and exposure of individual symbols. However, in many cases, words or sentencees are required on many diagrams. The letters comprising these words are, of course, located on various slides and the usual method of selecting each letter and positioning it (as previously described) might result in inexact alignment and spacing. Accordingly, an automatic lettering capability is provided which permits an operator, once he has manually positioned and exposed the first letter of a word, to merely select succeeding letters at the symbol select panel; the letters will be automatically exposed while the proper spacing between letters is maintained. This capability permits horizontal or vertical lettering and the characters can be rotated or magnified as previously described. The capability also extends to the forming of sets of numbers.

FIG. 18 shows the circuits used to achieve this automatic lettering capability. By depressing auto-lettering switch S7, control of the drive and exposure circuits discussed above will be assumed by the automatic lettering circuit after the first letter of the desired word has been positioned and manually exposed. Thereafter, selected letters are automatically spaced the proper distance from the preceding letter and exposed. This character spacing capability is achieved by "reading" the width of a selected symbol and adding to it the increments of distance travelled by horizontal member 50 (FIG. 2) or vertical carriage 35 until a predetermined spacing has been achieved.

It is obvious that the spacing between letters will be dependent on the width of each character (an I is considerably narrower than a W). All characters on the symbol slides are designed so that their width, as projected on the viewing screen, is a multiple of .025 inch increments. The width of each character is "written" on the symbol slide 63 in the form of a circular window or windows in each corner of the slide. These windows are out of the line of sight of the optical projection system but in a line with the character width reader 187. This reader contains photodiodes PC3 through PC6. Any or all of these photodiodes, when excited by light through the slide windows, begin to conduct; their outputs control transistor switches T6 through T9 which in turn energize character width binary relays 1CW through 4CW. The state of these relays formulates a binary code which can represent up to 15 "bits" (1+2+4+8) of information, each "bit" representing .025 inch of character width. The width count is fed into count of 15 binary counter 190 so as to set the complement of the width (15 minus the width count) into the counter.

After the first character has been exposed and the complement of its width stored in binary counter 190, the carriage carrying the optical components is driven in the desired direction using a .025 detent circuit (a modification of the .125 inch detent circuit described earlier in this specification). This detent circuit 191 is made to send a pulse to binary counter 190 for every .025 inch of carriage travel. When the pulses from the .025 detent circuit have filled the binary counter (when the number of detent pulses plus the width complement equal 15), the binary counter returns to zero and emits a pulse which causes a relay to be energized resulting in power being removed from the drive circuits 192. The carriage is then halted at the point where the last detent pulse brought the count to 15. Since the complement of the width count is always set into the binary counter, the carriage will always be made to move a distance equal to the character width plus the standard character spacing.

Referring to FIG. 18, assume that the first letter of a word to be formed is "A" and that it is to be formed from left to right. Switch S7 is depressed energizing auto letter right relay ALR. Contacts ALR9 close providing a holding path for relay ALR. Contacts ALR15 close completing an output path from .025 detent circuit 191 to the input of binary counter 190. The letter A is then selected by depressing the appropriate button at the selector panel. The letter is positioned, rotated and exposed with relays ME, SE and SEH in expose circuit 193 being energized as previously described. Auto letter enable relay ALE becomes energized through now closed contacts ALR9 and SE18. Contacts ALE2 close providing a holding path for relay ALE. Contacts ALE4 and ALE5 transfer switching control of end of expose relay EC to the auto-lettering circuit.

After exposure and before slide 63 containing the symbol A is returned to its slot in the slide magazine, light will shine through (in this example) the bottom two windows of the slide. The light falls on photodiodes PC3 and PC4 causing them to conduct heavily driving the bases of transistors T6 and T7 to ground. These transistors are forward biased through now closed contacts ME7 and SEH18 and complete an energization path to character width 1 and character width 2 relays 1CW and 2CW. Contacts CW1 of these relays transfer setting up the width count complement input (here 15−(2+1) to binary counter 190. Contacts CW8 of 1CW and 2CW close completing an energization path to counter set relay CS and auto letter hold relay ALH. Contacts CS6 close applying the positive voltage to capacitor C2. This capacitor applies a single pulse to the binary counter causing a count to be set in which is the complement of the width (15−3=12). The drive right circuit 192 is energized at the same time as relay CS and ALH. The horizontal member 50 (FIG. 2) is driven to the right and the .025 detent circuit 191 begins sending a pulse to binary counter is filled (after 3 pulses), the counter emits a pulse lifting the terminal end of resistor R6 off ground causing a forward bias to be applied to transistors T10 and T11. These transistors conduct heavily energizing binary counter relay BC. Contacts BC2 close providing a holding circuit for relay BC. Contact BC3 open removing power from drive circuit 192 halting the horizontal member; contacts BC4 close applying 28 d. DC to relay EEC, energizing the relay. Relay ME is then deenergized, opening contacts ME7. This causes relay EEC, CS, ALH, 1CW and 2CW to become deenergized. Contacts ALH12 open deenergizing relay BC. Only relays ALR and ALE remain energized.

The second and all subsequent characters are selected by depressing the appropriate button on the selector panel but the expose and spacing cycles are initiated automatically by different circuitry than for the first character selected. Relays ME and SE used in manual exposure are bypassed. Instead, diode matrix enable relay DME and slide change relay SC are energized through contacts ALE10.

Assuming the second letter, an "I," has been selected and presented, light shining through three windows in the corner of this slide fall on photodiodes PC3, PC4 and PC5 causing them to conduct heavily driving the bases of T6, T7 and T8 to ground. These transistors are forward biased through contacts SC7 and now conduct completing an energization path to relays 1CW, 2CW and 3CW. Contacts CW1 of these relays transfer to set up the width count complement input (here 15−1+2+4 or 8) to binary counter 190. Contacts CW8 of these relays close and power is applied to the expose circuit through contacts SC7, CW8 and ALR12.

After the character is exposed, relay SEH is energized; contacts SEH15 close completing an energization path to relays CS and ALH. Contacts CS6 close applying the set pulse to the binary counter through capacitor C2. The complement of the character width (15 −7=8) is set into the counter. The drive circuits are also energized when contacts CS6 close. The horizontal member is driven to the right and the .025 detent circuit begins sending a pulse to the binary counter for each .025 inch of member travel until the counter is filled. In the present example, this will be after 8 pulses. As described above, relay BC is energized removing power from the drive circuits and energizing relay EEC. Contacts EEC10 open deenergizing relay SC. Contacts SC7 open causing relays EEC, CS, ALH, 1CW, 2CW and 3CW to become deenergized. Contacts ALH12 open deenergizing relay EC. Once again, only relays ALR and ALE remain energized and another letter is ready to be selected.

A general description of the line-making capability has been previously provided in the discussion of the general operation. This description explained how the invention is used to select the type of line required, place it on the viewing screen, and select the desired width. The line is positioned and rotated on the screen using the substantially same circuits described above for symbol positioning and symbol rotation.

The following paragraphs will be limited to describing the circuits required to alter the length of a line, change its width and expose it on the film.

FIG. 19 shows the circuit used to extend or retract the left end of the line. 28 v. DC is applie by setting switch S8 to one of three alternate paths consisting of resistors R7, R8, R9 and capacitor C3. Capacitor C3 is charged at a rate determined by the RC time constant of the particular path selected to the point where it fires unijunction transistor T10 and causes a pulse to be applied through emitter follower transistor T11. The output from transistor T11 is applied through wipers of switch S8 pulsing either input 7 or 8 of controller 194. Controller 194 is a flip-flop multivibrator with a push-pull output. It converts the sequential input pulses to DC voltage pulses which are applied to the two windings of left end motor 120 to step the motor. Depending on the sequence and which half of each winding is pulsed, the motor will step in either the clockwise or counterclockwise direction to rotate the line end shutter in that direction.

An RC time constant with a rapid pulse rate input to controller will cause motor 120 to step at a rapid rate and result in a fast coarse line adjustment. As the pulse rate input is made to decrease, the motor will be stepped more slowly, permitting a finer line adjustment. The present invention translates, through gearing, each pulse input to motor 120 to a 0.008 inch advance of either line and shutter.

Figure 22:
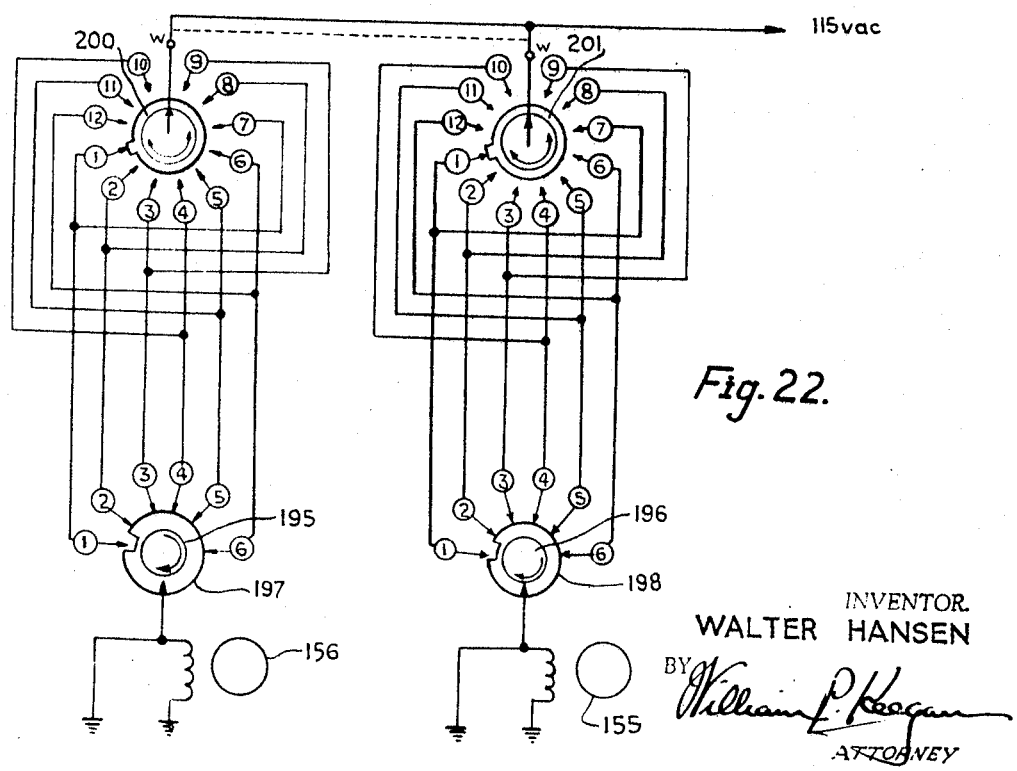
FIG. 22 is a schematic diagram of the line width circuit.

FIG. 22 shows the circuit used to change the width of a line formed on the screen. As described above, the angular position of two cams determines the gap between two steel plates through which the light forming the line passes. The detenting of the gap at pre-determined widths is accomplished by keying to the cam shafts 195 and 196 switch rotors 197 and 198 respectively. Six brushes (one for each different line width) are spaced at appropriate points on the cam rotors; these brushes are wired to ganged contacts of switch stators 200 and 201. The ganged rotor contacts supply 115 v. AC through the manually selected switch stator contacts to the windings of stepper motors 155 and 156. These motors rotate cams 146 and 147 (FIG. 8) and cam switch rotors 197 and 198 until the open position of the cam shaft rotors appear at the brushes carrying the 115 v. AC from the switch stators contacts. With their drive circuits opened, motors 155 and 156 stop and hold the coupled cams at that point which corresponds to the desired gap between the two plates.

Figure 20:
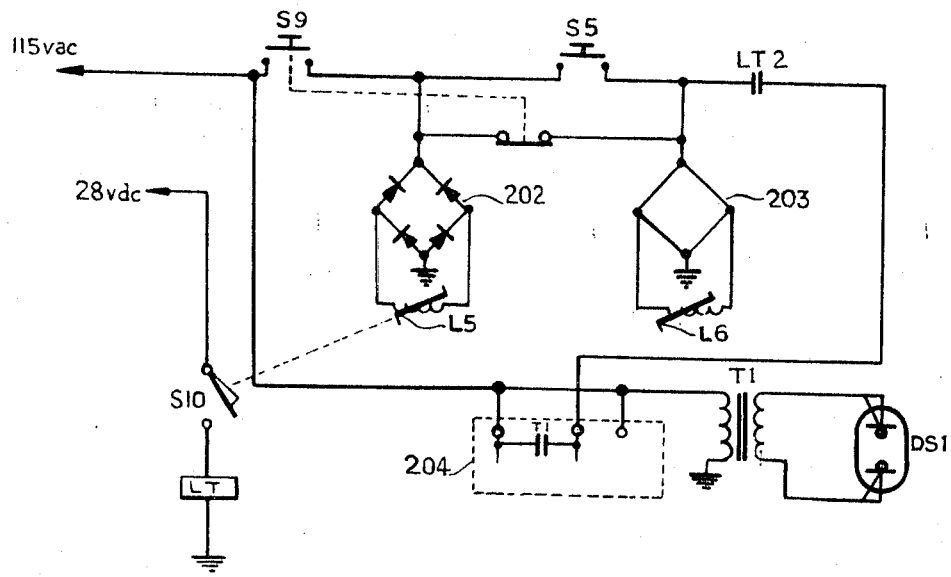
FIG. 20 is a schematic wiring diagram of the line expose circuit.

Assuming that the line has been positioned, set at the proper angle and its length composed and width adjusted, it is now ready to be exposed. Referring to FIG. 20, when the operator depresses trial switch S9, 115 v. AC is applied to a bridge rectifier 202 whose output energizes solenoid L5. This solenoid, located on the line bar assembly 36 (FIG. 2) jams the line width strips against the film thereby preventing light leakage at the film's edge and producing a sharp view of the projected line. As solenoid L5 is actuated, it mechanically closes switch S10 causing 28 v. DC to be applied to, and energizing, lines trial relay LT. The contacts of this relay are set up so that, when energized, all line circuits are disabled to prevent movement of the line during exposure. The line is now contact-exposed by pressing upon switch S5 while keeping trial switch S9 depressed. 115 v. DC is applied through switches S9, S5 to bridge rectifier 203 whose output energizes solenoid L6. This solenoid also jams against the width strips and provides additional pressure to hold the strips against the film for maximum line definition. Switch S5 also applies 115 v. AC through now closed contacts LT2 to input terminal of line expose timer 204 thereby starting the timer by closing contacts T1. Normally open contacts within the timer close applying 115 v. AC to transformer T1 which provides power to illuminate expose lamp DS1 for the timing duration set on the control face of timer. Although switches S5 and S9 are open since the switch has been released, solenoids L5 and L6 remain energized until the expose cycle preset into the timer has ended since energizing power to the solenoids is now being supplied from the input terminal of the timer.

The invention has been shown and described in preferred form only and by way of example, but many variations and modifications may be made therein. It is understood therefore that the invention is not limited to any specific form or embodiment, except insofar as such limitations are specified in the appended claims.

What is claimed is:

1. A photographic drafting machine comprising a sensitized sheet holder, means for projecting and exposing selected images of drafting symbols onto a sensitized sheet held on said sheet holder, means for contact printing line images onto the sensitized sheet whereby previously exposed symbol images may be interconnected, said contact printing means including a first movable means for defining the position of one end of a line on the sensitized sheet, a second movable means for defining the length of the line, adjustable means for defining the thickness of the line, a housing for carrying all of said contact printing means adjacent to said sheet holder, a light source mounted within said housing, and means for rotating said housing relative to said sheet holder whereby lines may be contact printed in at least vertical and horizontal directions onto a sensitized sheet, and means for moving said image projecting means and line contact printing means relative to said sheet holder whereby images and lines may be placed where desired on a sensitized sheet mounted on said sheet holder.

2. A photographic drafting machine according to claim 1 wherein said symbol projecting means include a symbol matrix holder for holding a plurality of individual symbol matrices, means for moving said matrix holder and for stopping it with a selected matrix at a desired location, and means for extracting the selected matrix and placing it in the optical projection path.

3. A photographic drafting machine according to claim 1 wherein said symbol projecting means includes a stationary lens system, a light source common to all the symbols to be projected and optical means to cause rotation of selected symbol images whereby a selected symbol can be oriented and imaged on the sensitized sheet in any desired position.

4. A photographic drafting machine according to claim 1 including a third moveable means having transparent portions laid into unique patterns whereby when different portions of said means are positioned in front of the source, different selectable types of lines will be formed on the sensitized sheet.

5. A photographic drafting machine according to claim 1 including carriage means on which said symbol projection means and said line contact printing means are mounted, means for moving said carriage means vertically and horizontally at differing rates of speed whereby symbol images and lines are quickly and accurately positioned for exposure anywhere upon the surface of the sensitized sheet.

6. A photographic drafting machine according to claim 5 including means for automatically exposing and spacing letters and numerals wherein said letters and numerals are each formed on a symbol matrix together with a signal representing the letter or numeral width, said means comprising means for decoding the character width signal of an exposed character and means responsive to the decoded signal for incrementally moving said carriage a distance corresponding to the width of the exposed character whereby a subsequent letter can be exposed in proper spaced relationship to said exposed letter.

7. A drafting machine for photographically preparing diagrams of interconnected lines and symbols on a sensitized sheet comprising two emulsions, one for retaining a latent image of an exposed symbol or line and the other for retaining a patent image which remains visible and serves as a guide during continuing diagram construction, said machine comprising a sensitized sheet holder, means for projecting and exposing selected images of drafting symbols onto a sensitized sheet held on said holder, means for contact printing line images onto the sensitized sheet to connect symbol images, means for controlling the position on the sensitized sheet at which symbols and lines are imaged, means for producing a low level of illumination whereby a projected symbol image or line may be visible but not exposed on the sensitized sheet, and means for increasing the illumination level so as to produce a latent image on emulsion and a patent image on the other emulsion of the sensitized sheet.

References Cited

UNITED STATES PATENTS

| 3,041,930 | 7/1962 | Davidson | 88—24 X |
| 3,122,075 | 2/1964 | Klyce et al. | 88—24 X |
| 3,149,529 | 9/1964 | Critchlow | 88—24 |
| 3,323,414 | 6/1967 | Ritchie et al. | 88—24 |

NORTON ANSHER, Primary Examiner

RICHARD A. WINTERCORN, Assistant Examiner

U.S. Cl. X.R.

95—4.5; 353—117; 355—43, 86